United States Patent
Morrow et al.

(10) Patent No.: US 6,574,094 B1
(45) Date of Patent: Jun. 3, 2003

(54) METHOD AND APPARATUS FOR COOLING BUS BARS

(75) Inventors: Ernest J. Morrow, Monticello, FL (US); Sally M. Sellers, Tallahassee, FL (US); Gary D. Knudsen, Tallahassee, FL (US)

(73) Assignee: General Dynamics Land Systems Inc., Sterling Height, MI (US)

( * ) Notice: Subject to any disclaimer, the term of this patent is extended or adjusted under 35 U.S.C. 154(b) by 0 days.

(21) Appl. No.: 10/120,811

(22) Filed: Apr. 11, 2002

(51) Int. Cl.$^7$ .............................. H07B 1/00; H05K 7/20
(52) U.S. Cl. ................ 361/676; 62/259.2; 165/104.33; 165/908; 174/71 B; 174/133 B; 174/15.2; 174/16.2; 361/700; 361/775; 361/699; 361/690; 361/704; 361/715
(58) Field of Search .............................. 165/80.4, 80.3, 165/104.33, 908; 174/15.1–15.2, 16.1–16.3, 71 B, 149 B, 72 B, 88 B, 99 B, 133 B; 361/611, 613, 624, 636–640, 648–650, 688, 690, 698–704, 715, 775, 831; 62/259.2

(56) References Cited

U.S. PATENT DOCUMENTS

| | | | |
|---|---|---|---|
| 2,305,210 A | 12/1942 | Wahlin | |
| 2,971,250 A | 2/1961 | Wahlin | |
| 3,054,563 A | 9/1962 | Steinen | |
| 3,314,611 A | 4/1967 | McCartney et al. | |
| 3,510,065 A | 5/1970 | Gigantino et al. | |
| 3,566,959 A | * 3/1971 | Koltuniak et al. | 361/80.3 |
| 3,728,585 A | * 4/1973 | Olashaw | 361/700 |
| 3,843,055 A | 10/1974 | Nord et al. | |
| 4,366,528 A | * 12/1982 | Cole | 174/133 B |
| 4,641,785 A | 2/1987 | Grothe | |
| 4,646,977 A | 3/1987 | Iwamura et al. | |
| 5,044,970 A | * 9/1991 | Reuter | 136/699 |
| 5,220,804 A | 6/1993 | Tilton et al. | |
| 5,314,529 A | 5/1994 | Tilton et al. | |
| 5,719,444 A | 2/1998 | Tilton et al. | |
| 5,880,931 A | 3/1999 | Tilton et al. | |
| 5,907,473 A | 5/1999 | Przilas et al. | |
| 5,933,700 A | 8/1999 | Tilton | |
| 5,943,211 A | 8/1999 | Havey et al. | |
| 5,999,404 A | 12/1999 | Hileman | |
| 6,016,969 A | 1/2000 | Tilton et al. | |
| 6,060,966 A | 5/2000 | Tennant et al. | |
| 6,104,610 A | 8/2000 | Tilton et al. | |
| 6,108,201 A | 8/2000 | Tilton et al. | |
| 6,163,073 A | 12/2000 | Patel | |

* cited by examiner

Primary Examiner—Gregory Thompson
(74) Attorney, Agent, or Firm—Brooks & Kushman P.C.

(57) ABSTRACT

A method for cooling bus bars 12,14 in order to increase their current-carrying capacity while saving space and weight. The method comprises the steps of providing a housing having an interior wall; locating a distribution manifold 20 within the housing, the distribution manifold comprising a hollow bus bar 12,14; communicating to the manifold a supply of an evaporative coolant 18, 18'; and delivering the coolant 18, 18' outwardly under pressure so that upon exiting the manifold 20, the coolant 18, 18' undergoes a phase change from the liquid to the vapor state. Heat is extracted from the manifold 20 at least as quickly as heat is generated by the flow of current. The extraction of heat by the flow of coolant 18, 18' and evaporation maintains or lowers the temperature of the bus bar and enables a given size of bus bar to carry more current without a significant rise in temperature. The invention also includes an apparatus 10 for cooling bus bars 12,14 in an electrical circuit. The bus bars 12,14 are mounted in close proximity with each other, thereby saving space and weight in the electrical circuit and providing good electrical noise immunity.

9 Claims, 1 Drawing Sheet

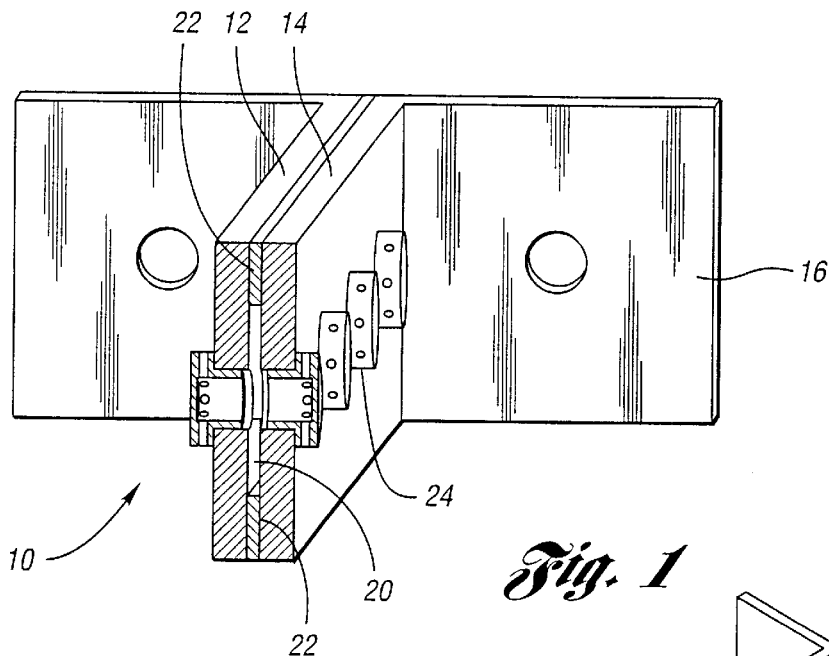
*Fig. 1*
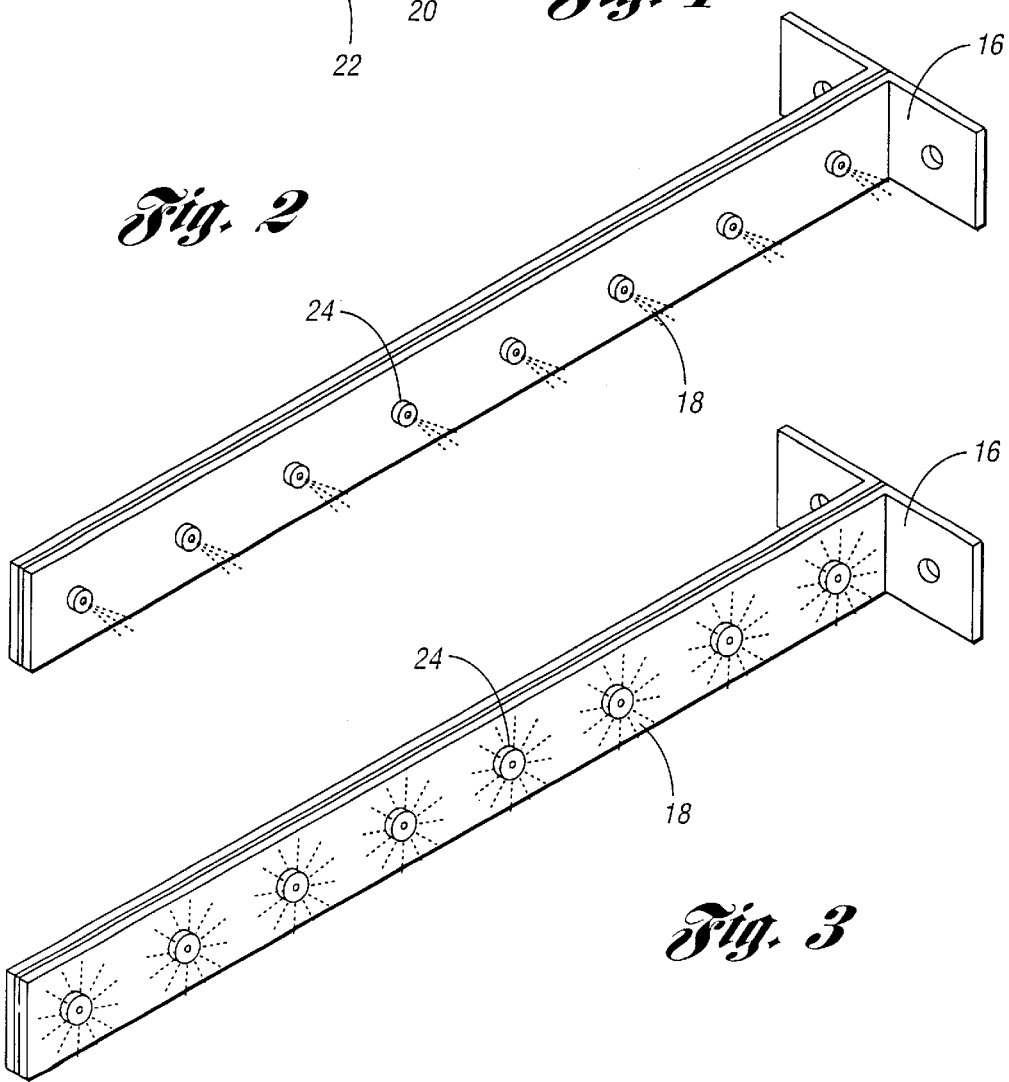
*Fig. 2*
*Fig. 3*

METHOD AND APPARATUS FOR COOLING BUS BARS

BACKGROUND OF THE INVENTION

1. Field of the Invention

This invention relates to a method and apparatus for cooling bus bars in an electrical circuit which requires control of its operating temperature for effective functioning.

2. Background Art

Power can be distributed in many ways in electronic systems. Power distribution in a high current environment (e.g., 25–2,500 amps) requires moving the current from a power supply to various components, such as amplifiers, rectifiers, routers, servers, etc. Among the more common methods used are those that involve heavy gauge wire and cable, circuit boards, and copper bus bars.

Historically, solutions to power distribution have involved one or more heavy copper bus bars that are provided with holes for connecting cables. Typically, the bars might be spaced apart from each other and be isolated by insulating spacers. Large copper or aluminum bus bars and cables have been used for years to distribute power within industrial control and telecommunication cabinets. They are large and can carry high power relatively easily. Traditionally, if the bus bars became hot from excessive current, more air was moved within a cabinet to cool them. If the bars were uninsulated (and thus perilous to the touch), they tended to be located remotely for safety reasons. In such a setting, cables were run to connect the bars to the components.

Today, however, the quest continues for higher power in smaller packages. It would be desirable to engineer power distribution systems that can operate at higher temperatures so that more power can be distributed within a system. Additionally, the packaging engineer contends with the problems of air flow and ventilation, vibration, noise, and efficient use of space.

In light of problems that are unsolved by previous approaches, it would be desirable to provide a cooling system for electrical components or conductors such as bus bars that increase the current-carrying capacity of the bus bar, while reducing its size, thereby saving space and weight.

Illustrative of prior art approaches is an evaporative spray coolant for cooling a heat source as described in U.S. Pat. No. 5,220,804, which issued on Jun. 22, 1993; and a method for cooling a heat source as described in U.S. Pat. No. 6,060,966, which issued on May 9, 2000.

SUMMARY OF THE INVENTION

The invention is a method for cooling bus bars in order to increase their current-carrying capacity while saving space and weight. The method comprises the steps of:

providing a housing having an interior wall;

locating a distribution manifold within the housing, the distribution manifold comprising a pair of hollow bus bars;

communicating to the manifold a supply of an evaporative coolant;

delivering the coolant under pressure through the bus bars so that upon exiting the manifold, the coolant impacts the external surface of the bus bar and/or other adjacent surfaces, so that a portion of the coolant undergoes a phase change from the liquid to the vapor state. Heat is extracted from the components at least as quickly as heat is generated by the flow of current. The extraction of heat maintains or lowers the temperature of the bus bar and enables a given size of bus bar to carry more current within an acceptable rise in temperature.

The invention also includes an apparatus for cooling bus bars in an electrical circuit. The apparatus comprises a circuit board and a plurality of bus bars mounted to the circuit board. Between at least some of the bus bars is an enclosed space which defines a distribution manifold through which an evaporative coolant flows.

The bus bars are mounted in close proximity with each other, thereby saving space and weight in the electrical circuit and providing good electrical noise immunity.

BRIEF DESCRIPTION OF THE DRAWINGS

FIG. 1 is quartering perspective view, partially sectioned, of bus bars mounted upon a flange, the bus bars defining a distribution manifold through which a coolant flows;

FIG. 2 is a quartering perspective view of an evaporatively-cooled bus bar which distributes a substantially perpendicular spray pattern; and FIG. 3 is a quartering perspective view of an evaporatively-cooled bus bar which generates a spray pattern which is substantially parallel to the bus bar.

DETAILED DESCRIPTION OF THE PREFERRED EMBODIMENT(S)

In FIG. 1, there is depicted an apparatus 10 for cooling an electrical component such as one or more bus bars 12,14 in an electrical circuit. The apparatus 10 includes a mounting flange 16 to which the bus bars are attached by conventional means. The bus bars 12,14 define therebetween an enclosed space 20 that defines a distribution manifold through which an evaporative coolant 18, 18' (FIGS. 2–3) flows. The distribution manifold 20 is formed by a pair of hollow bus bars 12,14 that are separated by a spacer strip 22. Upon exiting the manifold 20, the coolant 18, 18' impacts the external surface of adjacent bus bars and/or other surfaces. A portion of the coolant 18, 18' undergoes a phase change from the liquid to the vapor state. During that phase change, the heat is extracted from the components at least as quickly as heat is generated by the flow of current. One thermodynamic result is that the temperature of the electrical component is maintained or lowered, thereby enabling a given size of component to carry more current within an acceptable rise in temperature.

As a result of the disclosed invention, several bus bars can be mounted in close proximity with each other, thereby saving space and weight in the electrical circuit, while providing good electrical noise immunity. This confers advantages in packaging smaller components within the confined space constrictions of electronic circuitry.

Also depicted in FIGS. 1–3 are nozzles 24 which can be selectively configured as required to cool both the bus bar and any surrounding electronics. Thus, the nozzles 24 can be configured to provide a targeted effluent pattern (as depicted in FIG. 2) or a more diffused flow pattern, as depicted in FIG. 3. In FIG. 2, the resultant spray pattern is also termed a "perpendicular" spray pattern; the spray pattern of FIG. 3 is also termed a "parallel" spray pattern.

Thus, the invention relates to a method for cooling bus bars and distributing coolant to high heat-generating components in order to increase their current-carrying capacity while saving space and weight. The bus bars are mounted within a housing having an interior wall.

The manifold communicates with a supply of an evaporative coolant. The coolant is delivered under pressure so that upon exiting the manifold, it is dispersed as a spray and is directed at high heat-generating components. Concomitantly, an amount of heat that is proportional to the mass of vapor and latent heat of evaporation is extracted from a pair of hollow bus bars. The rate of heat extraction is at least as great as the rate of heat generation by the flow of current. The extraction of heat by the flow of coolant and evaporation maintains or lowers the operating temperature of the bus bars.

At least some of the coolant condenses upon an interior wall of the housing following evaporation. Without additional cooling, this phase change is typically accompanied by a rise in temperature at the wall of the housing. To extract heat from the housing, a finned surface is provided upon an external surface of the housing. This finned surface allows heat to be transferred by convection therefrom. The temperature of the housing is thereby maintained at a temperature lower than the boiling point of the coolant.

In a preferred embodiment, a return flow path is provided for the condensed coolant from the interior walls of the housing to the distribution manifold.

In another preferred embodiment, one or more spacers 22 or spacer strips separate adjacent bus bars. The spacers provide a fluid seal between facing surfaces of adjacent bus bars. In this way, a leak-free space is defined within the distribution manifold through which liquid coolant may flow. It will be understood that the spacer or spacer strip is preferably made of a non-conductive material. In this manner, the juxtaposition of bus bars separated by the spacers serves as a capacitor and noise filter. In practice, in one embodiment, the space between adjacent bus bars is sealed with an epoxy type of adhesive which affixes a strip of a mixture of epoxy and fiberglass to an edge of facing bus bars.

In operation, as depicted in FIGS. 1–3, one or more nozzles are provided in one or more of the bus bars. The nozzles 24 are configured so that the evaporative coolant exiting from a given bus bar may be directed toward a facing bus bar in an adjacent pair of bus bars or other electrical components in the electrical circuit. In one embodiment (FIG. 2), the nozzles are configured so that the evaporative coolant exiting from a given bus bar exits substantially perpendicularly to a cooling surface of the given bus bar, thereby predominantly cooling an adjacent bus bar or other electrical components. Alternatively (FIG. 3), one or more of the nozzles are configured so that the evaporative coolant exiting from a given bus bar flows substantially parallel to a cooling surface of that bus bar, thereby predominantly cooling that bus bar itself.

Preferably, the evaporative coolant is a dielectric fluid having a relatively high breakdown voltage, i.e. up to about twice the voltage across the bus bars. As is known, a dielectric is a substance with very low electrical conductivity, i.e., is an insulator. Liquid dielectrics include hydrocarbon oils, askarel, and silicone oils. As used herein, the term "breakdown voltage" refers to the maximum voltage that the dielectric can withstand without breakdown. Beyond that voltage, considerable current passes as an arc, usually with more or less decomposition of the fluid along the path of the current.

Preferably, the evaporative fluid of the subject invention is a thermally stable-liquid, such as a perfluorocarbon. One example is the Fluorinert™ electronic liquid FC-77 that is available from the 3M Company of Minneapolis, Minn. An alternative dielectric is sold under the name Flutec™ which is manufactured by F2 Chemicals Limited of Lancashire, England. The inertness of such fluids permits their use as a direct contact, single and multiple phase coolant in the electrical environment. Their high dielectric strength and low electrical conductivity render them suitable for applications in high voltage transformers and power electronics.

In the environment under consideration, the evaporative fluid is dispensed in liquid droplets that impact upon the electrical components. Ideally, the temperature of the liquid droplets prior to impact is just below the fluid's boiling point. In this manner, at least a portion of the incident evaporative fluid becomes vaporized, with a desired efficiency of at least 15–20%. As defined in this disclosure, "efficiency" is defined as the ratio of the actual heat transferred to the theoretical maximum heat transferred. The theoretical maximum heat transfer is the sensible and latent heat associated with 100% vaporization of the liquid impacting the surface.

The packaging approach described herein allows bus bars to be mounted back-to-back in order to create good electrical noise immunity as well as to provide an enclosed space for fluid flow, as depicted in FIGS. 1–3. It will be appreciated that the disclosed bus bar and nozzles may be flexibly configured in terms of their size and orientation, thereby allowing a range of designs that fall within the scope of the present invention. It will also be appreciated that the disclosed types of nozzle can be mixed and matched in order to provide cooling that is suitable for the specific application under consideration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for cooling bus bars in order to increase their current-carrying capacity while saving space and weight, comprising the steps of:

provding a housing having an interior wall;

locating a distribution manifold within the housing, the distribution manifold comprising a pair of hollow bus bars;

communicating to the manifold a supply of an evaporative coolant; and delivering the coolant under pressure so that upon exiting the manifold, the coolant impacts an external surface of one or more bus bars adjacent to the manifold or other adjacent surfaces, so that at least a portion of the coolant undergoes a phase change from the liquid to the vapor state, and heat is extracted from the manifold and at least some of the one or more bus bars adjacent to the manifold at least as quickly as heat is generated by the flow of current, the extraction of heat by the flow of coolant and evaporation thereby maintaining or lowering the temperature of the bus bars and enabling a given size of bus bar to carry more current without a significant rise in temperature.

2. The method of claim 1, further comprising the step of:
allowing at least some of the coolant following evaporation to condense upon an interior wall of the housing.

3. The method of claim 1, further comprising the step of:
providing an external finned surface upon the housing, thereby allowing heat to be transferred by convection therefrom and maintaining the temperature of the housing lower than the boiling point of the coolant.

4. The method of claim 3, further comprising the step of:

communicating a return flow path for the condensed coolant from at least one of the interior walls of the housing to the distribution manifold.

5. An apparatus for cooling bus bars in an electrical circuit, comprising:

a flange;

a plurality of bus bars mounted to the flange, an enclosed space between an adjacent two of the plurality of bus bars defining a distribution manifold through which an evaporative coolant flows, so that upon exiting the manifold, the coolant impacts an external surface of one or more bus bars adjacent to the plurality of bus bars or other adjacent surfaces, so that at least a portion of the coolant undergoes a phase change from the liquid to the vapor state, and the heat is extracted from the plurality of bus bars mounted to the flange and the one or more bus bars adjacent thereto and or other adjacent surfaces at least as quickly as heat is generated by the flow of current, the extraction of heat by the flow of coolant and by evaporation thereby maintaining or lowering the temperature of the bus bars and enabling a given size of bus bar to carry more current without a significant rise in temperature, the plurality of bus bars and the one or more bus bars or other adjacent surfaces being mounted in close proximity with each other, thereby saving space and weight in the electrical circuit and providing good electrical noise immunity.

6. The apparatus of claim 5, further comprising:

one or more spacers extending between adjacent bus bars in the plurality of bus bars mounted to the flange.

7. The apparatus of claim 5, further comprising:

one or more nozzles associated with one or more of the plurality of bus bars, some of the one or more nozzles being configured so that the evaporative coolant exiting from a given bus bar is directed towards a facing bus bar or other electrical components in the apparatus.

8. The apparatus of claim 7, wherein some of the one or more nozzles are configured so that the evaporative coolant from a given bus bar exits substantially perpendicularly to a cooling surface of the given bus bar, thereby predominantly cooling adjacent components.

9. The apparatus of claim 7, wherein some of the one or more nozzles are configured so that the evaporative coolant exiting from a given bus bar exits substantially parallel to a cooling surface of the given bus bar, thereby predominantly cooling that bus bar.

* * * * *